US009481417B2

(12) United States Patent
Holland

(10) Patent No.: US 9,481,417 B2
(45) Date of Patent: Nov. 1, 2016

(54) MODULAR TRAILER ASSEMBLY

(71) Applicant: Michael J. Holland, Laguna Niguel, CA (US)

(72) Inventor: Michael J. Holland, Laguna Niguel, CA (US)

( * ) Notice: Subject to any disclaimer, the term of this patent is extended or adjusted under 35 U.S.C. 154(b) by 0 days.

(21) Appl. No.: 14/473,523

(22) Filed: Aug. 29, 2014

(65) Prior Publication Data

US 2016/0059914 A1 Mar. 3, 2016

(51) Int. Cl.
    B62D 63/06 (2006.01)
    B60P 3/10 (2006.01)
    B62K 27/00 (2006.01)

(52) U.S. Cl.
    CPC ............ B62D 63/061 (2013.01); B60P 3/105 (2013.01); B60P 3/1033 (2013.01); B60P 3/1066 (2013.01); B62D 63/065 (2013.01); B62K 27/006 (2013.01)

(58) Field of Classification Search
    CPC .... B60P 3/105; B62D 63/061; B62D 63/065
    USPC ....... 280/1.5, 47.331, 79.7, 204, 292, 446.1, 280/482
    See application file for complete search history.

(56) References Cited

U.S. PATENT DOCUMENTS

| | | | |
|---|---|---|---|
| 2,260,676 A | 10/1941 | Lafaye | |
| 2,756,069 A | 7/1956 | Manngarn | |
| 3,169,782 A * | 2/1965 | Columbus | 280/479.2 |
| 4,266,793 A | 5/1981 | Pryor | |
| 5,067,738 A | 11/1991 | O'Connor | |
| 5,098,113 A | 3/1992 | Albitre | |
| 5,348,327 A | 9/1994 | Gieske | |
| 5,573,259 A * | 11/1996 | Castillo et al. | 280/204 |

FOREIGN PATENT DOCUMENTS

WO 8600054 1/1986

* cited by examiner

*Primary Examiner* — Anne Marie Boehler
*Assistant Examiner* — Felicia L Brittman
(74) *Attorney, Agent, or Firm* — Stetina Brunda Garred & Brucker

(57) ABSTRACT

A modular trailer assembly for attachment to a frame of a vehicle includes an elongate support member, a first connector rigidly mountable to the frame of the vehicle, a rear loop, and a second connector. The proximal end of the support member is pivotally connected to the first connector and selectively detachable therefrom. At least one wheel is rotatably connected to the distal end of the rear loop. The second connector includes a first frame member and a second frame member rotatably coupled to one another. The distal end of the first frame is configured to engage the proximal end of the rear loop. The proximal end of the second frame member is configured to engage the distal end of the support member. The first frame member is rotatably moveable to allow cargo to track with the vehicle independently of a change in orientation of the at least one wheel.

13 Claims, 11 Drawing Sheets

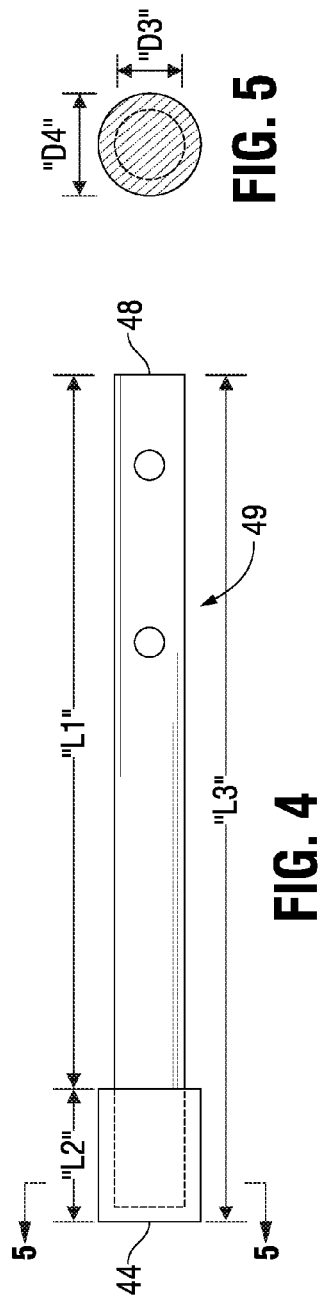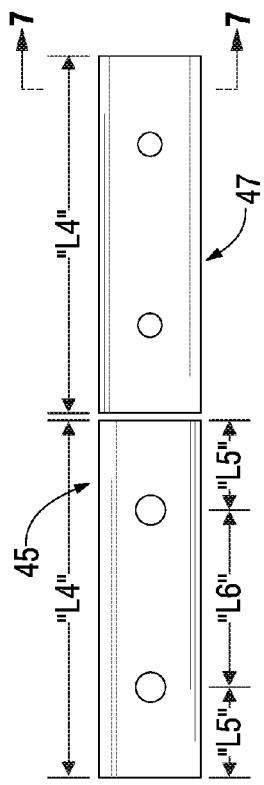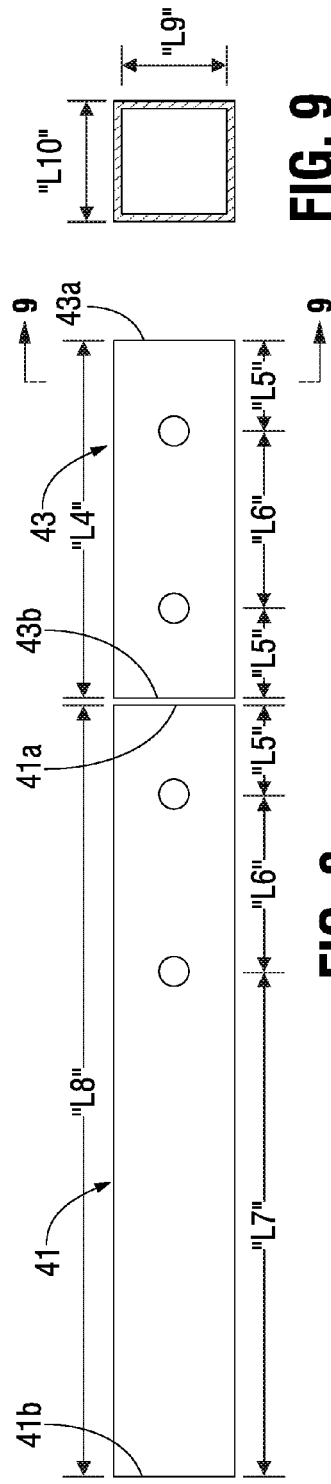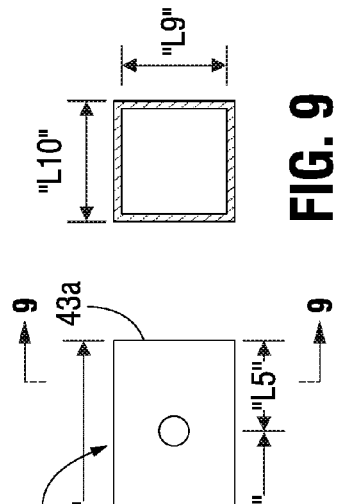

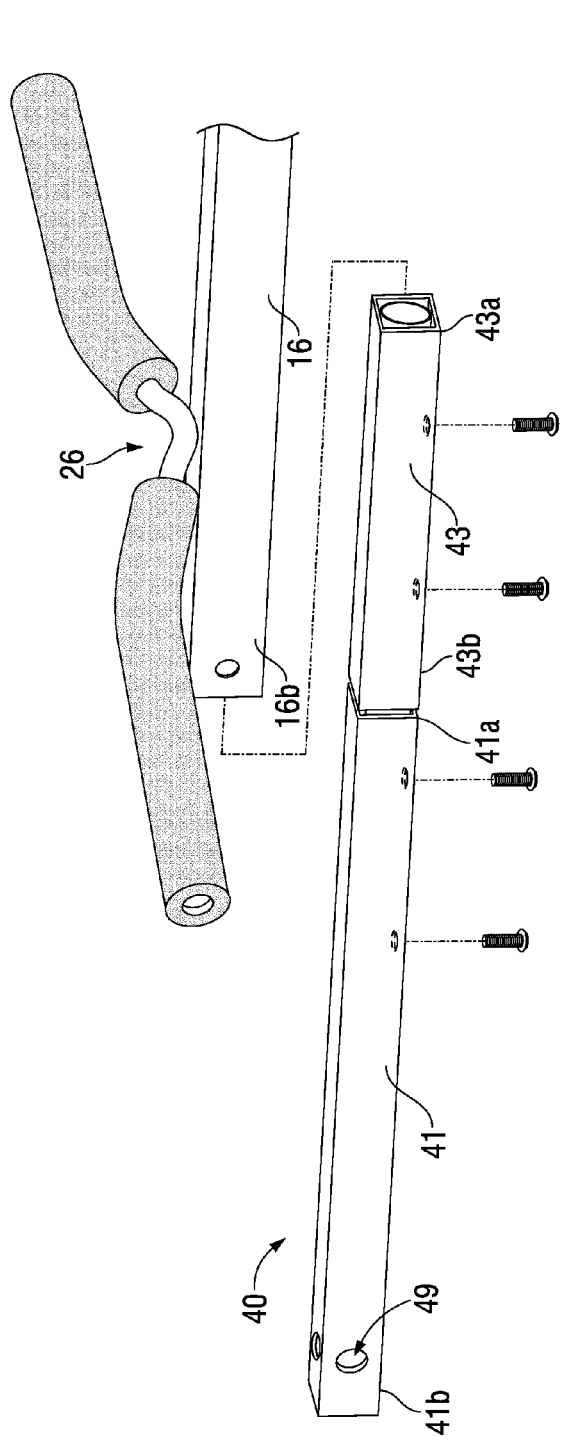
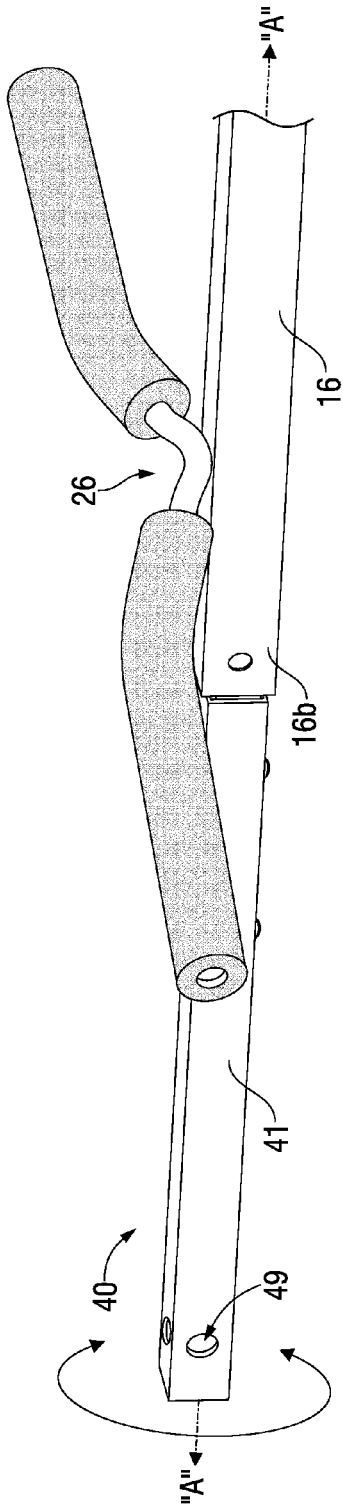
FIG. 10
FIG. 11

MODULAR TRAILER ASSEMBLY

BACKGROUND

1. Technical Field

The present disclosure relates to trailer devices. More particularly, the present disclosure relates to a modular trailer assembly configured for attachment to a frame of a vehicle and capable of supporting watersport equipment secured thereto.

2. Discussion of Related Art

Watersports such as surfing and stand-up paddle boarding are popular activities. Surfing/paddle boarding, though having participants of all ages, has a particularly large segment of teenage and young adult participants. Many of these teenage participants are not of age to drive a motor vehicle in which they may carry their surfboard (or stand-up paddle board, etc.) when traveling to beaches. In particular, many surfing/paddle boarding locations are remote from highways or parking lots and are only accessible via walkways or pathways. Because many beaches or lakes are extremely popular, surfers/paddle boarders are faced with considerable traffic congestion when trying to travel to and from such areas. As such, many surfers/paddle boarders find that bicycling to such areas is, in fact, a most preferred method of transportation. Thus, many individuals rely on bicycles as a preliminary mode of transportation and therefore must carry their surfboard/paddle board with them when riding their bicycle to the beach. As can be appreciated, carrying a surfboard/stand-up paddle board while riding a bicycle is extremely difficult as well as potentially dangerous.

To overcome the hardship of riding a bicycle while simultaneously carrying a surfboard, a number of surfboard trailer devices have been developed and are currently known in the prior art. However, such known surfboard trailer devices possess certain inherent deficiencies which detract from their overall utility.

One such prior art surfboard trailer device comprises a generally triangular carrier mountable to the rear portion of the bicycle. The carrier includes first and second support members attached to the rear axle of a bicycle in a manner wherein the first support member extends generally horizontally rearward from the rear axle and the second support member extends generally vertically upward from the rear axle. The surfboard is affixed to the outer ends of the first and second support members in a generally angular orientation. In using this particular trailer device, however, the support members may not be easily removed from the rear axle of the bicycle. Thus, when it is desired to use the bicycle at a time when a surfboard is not being transported thereon, one must undergo a difficult and time-consuming process to remove the support members from the rear axle.

A second prior art surfboard trailer device comprises an elongate support member having a first end attached to the seat support post of a bicycle and a second end terminating in a transversely extending axle having wheels placed on the opposed ends thereof. In this particular device, however, the wheels disposed on the opposed ends of the transversely extending axle create a wheel track which does not follow the track of the rear wheel of the bicycle itself. This particular occurrence makes control of the surfboard trailing the bicycle extremely difficult, particularly when traveling around curbs or corners.

Because traffic and parking are typically choked along beaches, many individuals ride their bicycles to the beach. However, surfboards, paddle boards, and the like are generally too unwieldy to be carried safely by an individual while riding a bicycle.

SUMMARY

The present disclosure is directed to a modular trailer assembly configured for attachment to a frame of a vehicle and capable of supporting one or more surfboards, paddle boards, and the like secured thereon. The presently-disclosed modular trailer assembly is configured for ease of assembly, and may include adjustable telescoping segments, e.g., to accommodate cargo when in use and/or to facilitate compact storage when not in use. The presently-disclosed modular trailer assembly is provided with cargo securing elements, such as flat woven straps, bungee cords, or flat bungee cord straps, and may be hand pullable by a user.

According to an aspect of the present disclosure, a modular trailer assembly configured for attachment to a frame of a vehicle is provided. The modular trailer assembly includes an elongate support member, a first connector, a rear loop, and a second connector. The first connector is rigidly mountable to the frame of the vehicle. The support member includes a proximal end, a distal end, and a length defined between the distal end and the proximal end. A plurality of rack member attachment regions are spaced apart along the length. The proximal end of the support member is pivotally connected to the first connector and selectively detachable therefrom. The rear loop includes a proximal end, a distal end, and at least one wheel rotatably connected to the distal end. The second connector includes a proximal end, a distal end, and a longitudinal axis defined between the distal end and the proximal end. The second connector also includes a first frame member and a second frame member rotatably coupled to one another. The distal end of the first frame member is configured to engage the proximal end of the rear loop. The proximal end of the second frame member is configured to engage the distal end of the support member. When the modular trailer assembly is in a cargo carrying configuration, wherein cargo is disposed above the support member, the first frame member is rotatably moveable about the longitudinal axis to allow the cargo to track with the vehicle independently of a change in orientation of the at least one wheel.

According to another aspect of the present disclosure, a bicycle trailer assembly configured for attachment to a bicycle frame is provided. The bicycle trailer assembly includes an elongate support member having proximal and distal ends, a plurality of rack members attached to the support member in spaced relation to one another, and a first connector rigidly mountable to the bicycle frame. The proximal end of the support member is pivotally connected to the first connector and selectively detachable therefrom. The bicycle trailer assembly also includes: a rear loop having a proximal end and a distal end; at least one wheel rotatably connected to the distal end of the rear loop; and a second connector having a proximal end, a distal end, and a longitudinal axis defined therebetween. The second connector includes a first frame member and a second frame member rotatably coupled to one another. The distal end of the first frame is configured to engage the proximal end of the rear loop. The proximal end of the second frame member is configured to engage the distal end of the support member. When the modular trailer assembly is in a cargo carrying configuration, wherein cargo is disposed above the support member, the first frame member is rotatably moveable about the longitudinal axis to allow the cargo to track with the bicycle frame independently of a change in orientation of the at least one wheel.

According to another aspect of the present disclosure, a modular trailer assembly adapted to be selectively configurable in first and second configurations wherein the modular trailer assembly is configured for attachment to a bicycle frame, and a third configuration wherein the modular trailer assembly is configured to be hand-towable, is provided. In the first configuration, the modular trailer assembly includes: an elongate support member having proximal and distal ends; a plurality of rack members attached to the support member in spaced relation to one another; a first connector rigidly mountable to the bicycle frame, wherein the proximal end of the support member is pivotally connected to the first connector and selectively detachable therefrom; a rear loop with two wheels rotatably connected thereto; and a second connector including a proximal end, a distal end, and a longitudinal axis defined therebetween. The second connector includes a first frame member and a second frame member rotatably coupled to one another. The distal end of the first frame is configured to engage the proximal end of the rear loop and a proximal end of the second frame member is configured to engage the distal end of the support member. In the second configuration, the modular trailer assembly includes: an elongate support member having proximal and distal ends; a plurality of rack members attached to the support member in spaced relation to one another; a first connector rigidly mountable to the bicycle frame, wherein the proximal end of the support member is pivotally connected to the first connector and selectively detachable therefrom; a rear loop with a wheel rotatably connected thereto; and a second connector including a proximal end, a distal end, and a longitudinal axis defined therebetween. The second connector includes a first frame member and a second frame member rotatably coupled to one another. The distal end of the first frame is configured to engage the proximal end of the rear loop and a proximal end of the second frame member is configured to engage the distal end of the support member. In the third configuration, the modular trailer assembly includes: a rear loop having a proximal end and a distal end; at least one wheel rotatably connected to the distal end of the rear loop; and a configuration of cargo securing elements adapted to secure cargo to the rear loop.

In any one of the preceding aspects, the support member may include a plurality of telescoping segments disposed between the proximal end and the distal end thereof. The telescoping segments may be adapted to allow the support member to be selectively movable between at least one extended configuration, wherein the rack members are positioned for use, and a collapsed configuration for storage.

In any one of the preceding aspects, the second connector may further include a first inner tube, a second inner tube, and an engagement rod. The engagement rod may include an elongate rod configured to be slidably received within the first and second inner tubes. The engagement rod may further include a cap disposed at one end of the elongate rod, wherein the cap has an outer diameter equal to an outer diameter of the first and second inner tubes.

In any one of the preceding aspects, the cargo may be watersport equipment.

BRIEF DESCRIPTION OF THE DRAWINGS

Objects and features of the presently-disclosed modular trailer assembly will become apparent to those of ordinary skill in the art when descriptions of various embodiments thereof are read with reference to the accompanying drawings, of which:

FIG. 4 is schematic diagram of an engagement rod of the rear loop connector of FIG. 3 in accordance with an embodiment of the present disclosure;

FIG. 5 is a cross-sectional view taken along the lines "5-5" of FIG. 4, illustrating the distal end of the engagement rod, in accordance with an embodiment of the present disclosure;

FIG. 6 is schematic diagram of first and second inner tubes of the rear loop connector of FIG. 3 in accordance with an embodiment of the present disclosure;

FIG. 7 is a cross-sectional view taken along the lines "7-7" of FIG. 6 in accordance with an embodiment of the present disclosure;

FIG. 8 is schematic diagram of first and second outer shafts of the rear loop connector of FIG. 3 in accordance with an embodiment of the present disclosure;

FIG. 9 is a cross-sectional view taken along the lines "9-9" of FIG. 8 in accordance with an embodiment of the present disclosure;

FIG. 10 is a perspective view of the rear loop connector and a distal portion of the support member of the modular trailer assembly of FIG. 1A, shown with parts separated, in accordance with an embodiment of the present disclosure;

FIG. 11 is a perspective view of the distal portion of the support member of FIG. 10, shown in a partially assembled state, in accordance with an embodiment of the present disclosure;

DETAILED DESCRIPTION

Figure 1A:
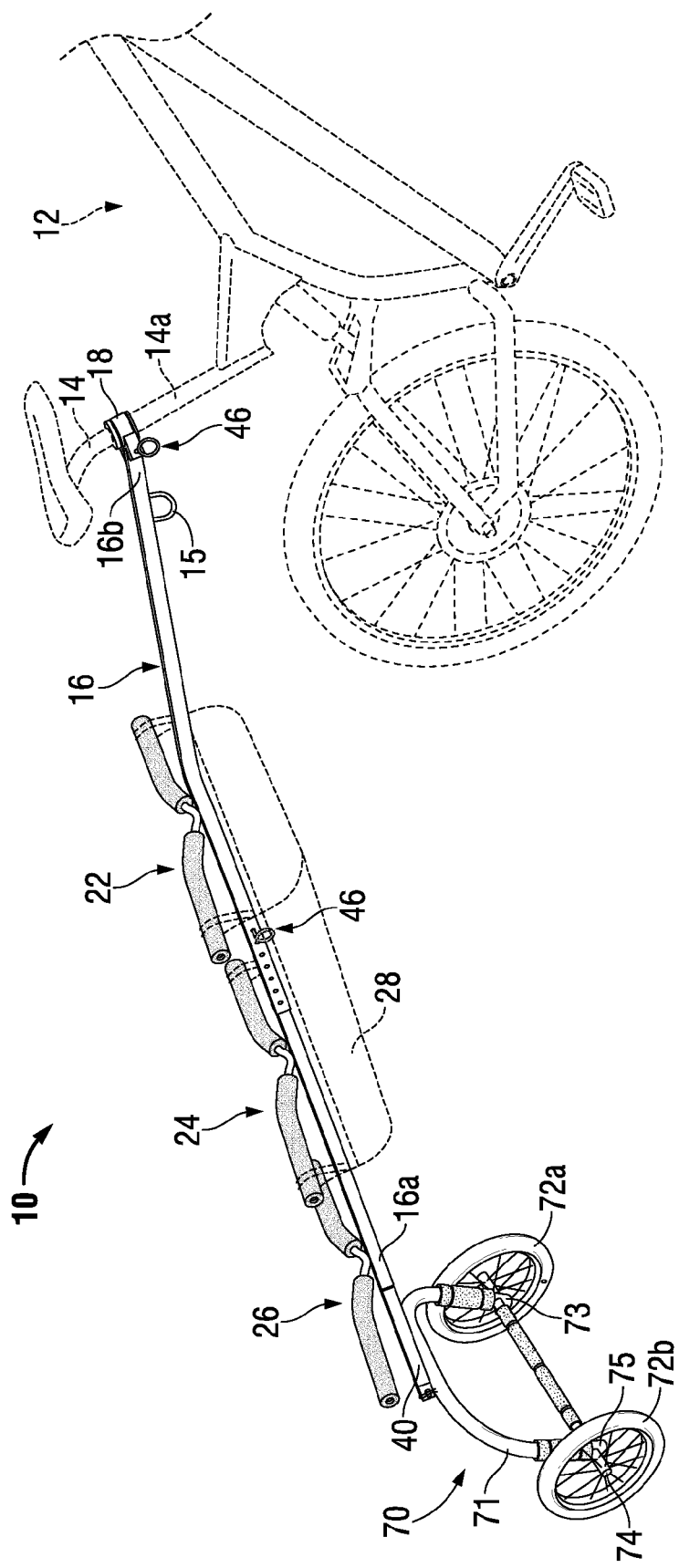
FIG. 1A is a perspective view of a modular trailer assembly in accordance with an embodiment of the present disclosure, as attached to a conventional bicycle.

Hereinafter, embodiments of a modular trailer assembly are described with reference to the accompanying drawings. Like reference numerals may refer to similar or identical elements throughout the description of the figures.

This description may use the phrases "in an embodiment," "in embodiments," "in some embodiments," or "in other embodiments," which may each refer to one or more of the same or different embodiments in accordance with the present disclosure.

As it is used in this description, "watersport equipment" generally refers to surfboards, wakeboards, paddle boards, kayaks, kitesurf boards and other watersport gear for activities involving any body of water, e.g., oceans, bays, rivers, and/or lakes.

Various embodiments of the present disclosure provide a modular trailer assembly configured for attachment to a frame of a vehicle and capable of supporting cargo (e.g., watersport equipment) secured thereon. Embodiments of the presently-disclosed modular trailer assembly include a first connector attachable to the frame of the vehicle, an elongate support member pivotally connected to the first connector, a rear loop having one or more wheels mounted thereon, and a second connector adapted to rotatably couple the rear loop to the support member. Embodiments of the presently-disclosed first connector may allow the support member to pivot and rotate relative to the frame of the vehicle. Embodiments of the presently-disclosed second connector may allow cargo disposed above the support member to track with the vehicle independently of a change in orientation of the one or more wheels mounted on the rear loop. Embodiments of the presently-disclosed first and second connectors may allow the modular trailer assembly to be pulled by a vehicle without interfering with the rider's ability to properly handle and control the vehicle, particularly around turns or when passing over bumps or other obstructions.

Various embodiments of the present disclosure provide a modular trailer assembly capable of taking a variety of configurations depending on the size of the cargo (e.g., watersport equipment) and/or depending on the user's need for a vehicle-towable trailer or a hand-towable trailer. Embodiments of the presently-disclosed modular trailer assembly may be marketable as a "kit," which may provide an opportunity for the user to purchase one or more components separately. Embodiments of the presently-disclosed modular trailer assembly may be adapted to be selectively configurable in a first configuration (e.g., two-wheeled modular trailer assembly) and a second configuration (e.g., single-wheeled modular trailer assembly), wherein the modular trailer assembly is configured for attachment to a frame of a vehicle (e.g., a bicycle frame), and a third configuration, wherein the modular trailer assembly is configured to be hand-towable.

Figure 1B:
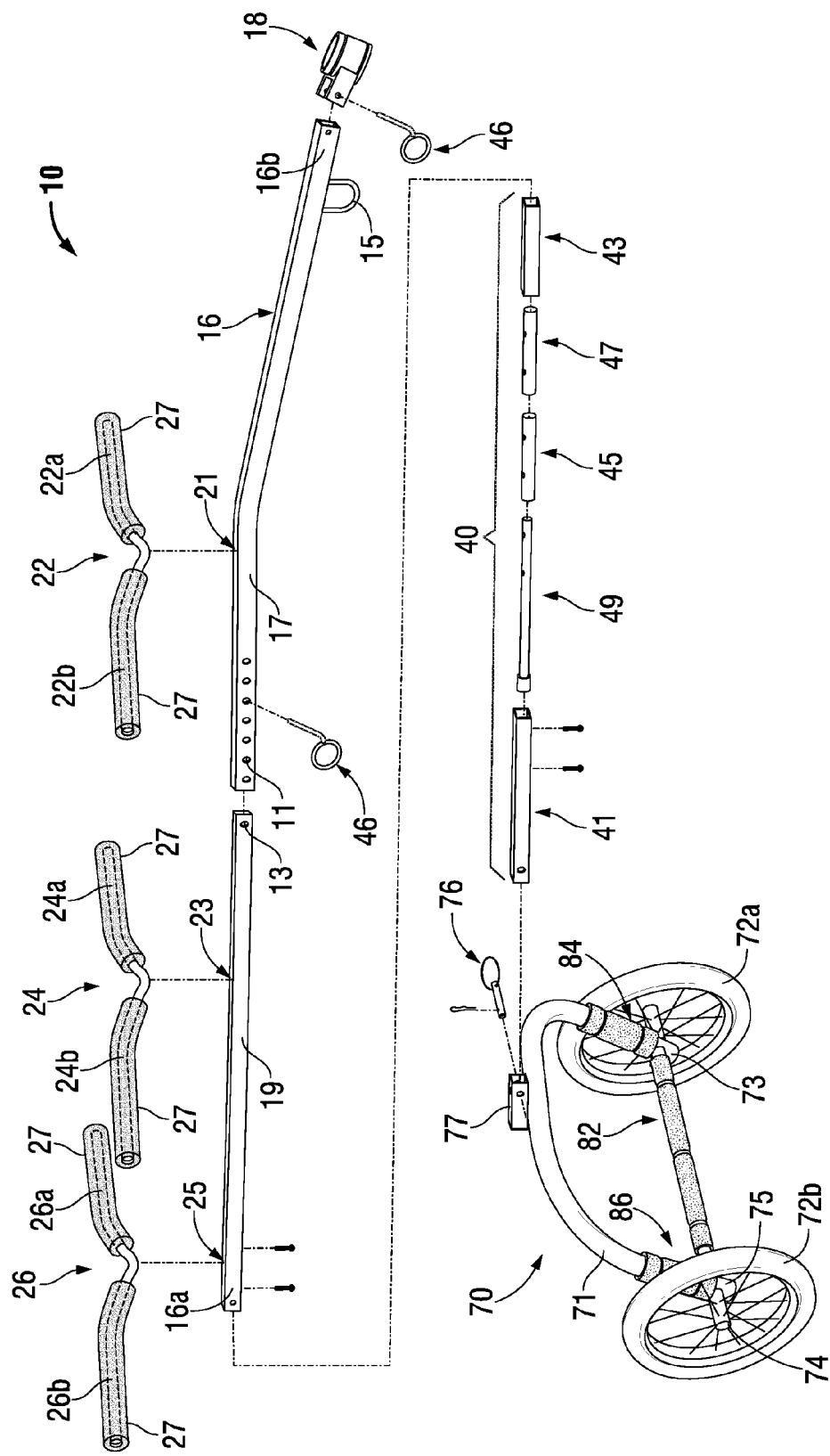
FIG. 1B is a perspective view of the modular trailer assembly of FIG. 1A, shown with parts separated, in accordance with an embodiment of the present disclosure.
Figure 2:
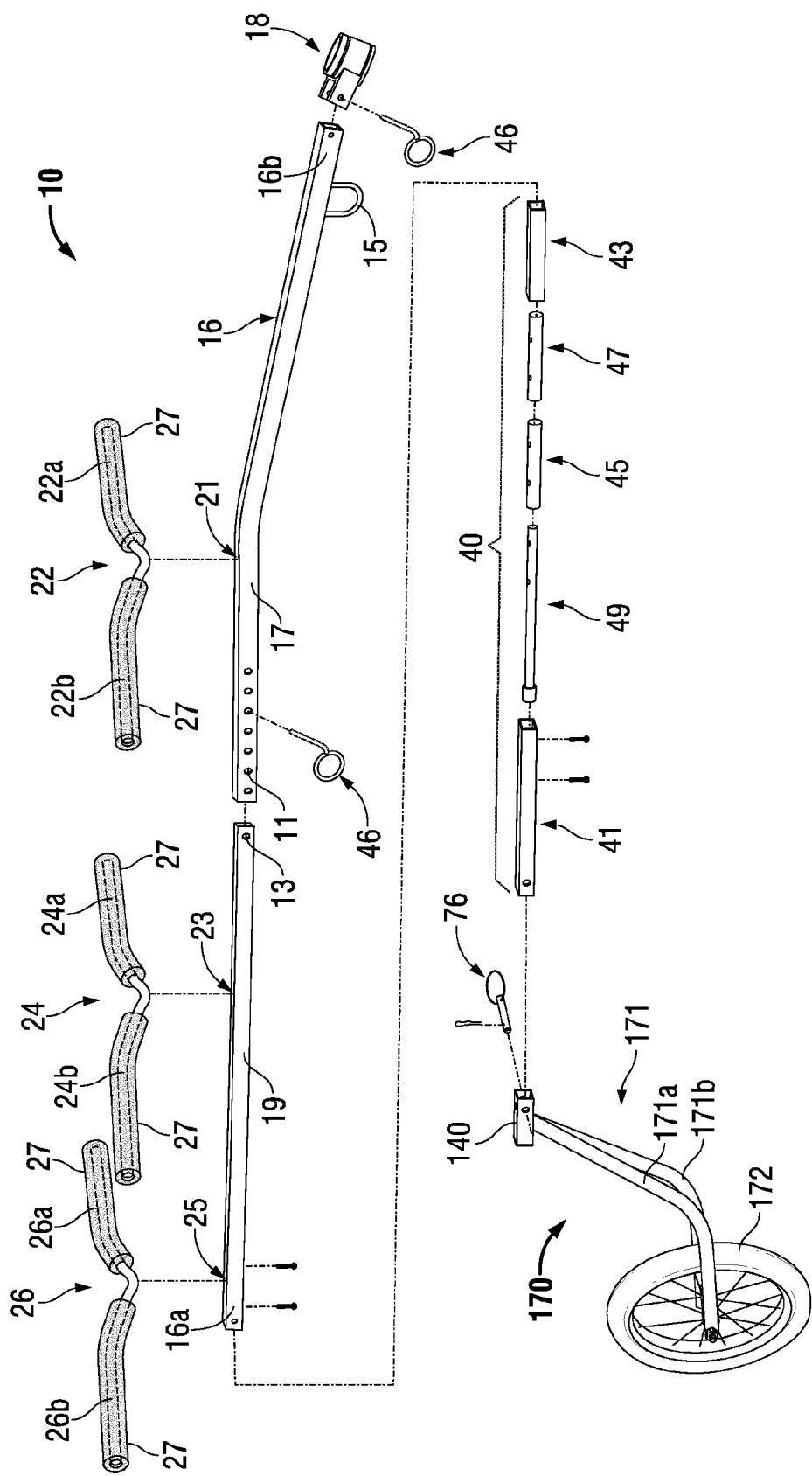
FIG. 2 is a perspective view of a modular trailer assembly, shown with parts separated, in accordance with another embodiment of the present disclosure.

Referring now to FIGS. 1A and 1B, there is shown a modular trailer assembly 10 in accordance with an embodiment of the present disclosure. The modular trailer assembly 10 includes an elongate support member 16, a rear loop 70, and a rear loop connector 40 disposed between and rotatably coupling the support member 16 and the rear loop 70. One or more wheels (e.g., two wheels 72a, 72b) are rotatably connected to the rear loop 70. In other embodiments, e.g., as shown in FIG. 2, the modular trailer assembly 10 may include a rear loop 170 and the rear loop connector 40 disposed between and rotatably coupling the elongate support member 16 and the rear loop 170.

Figure 3:
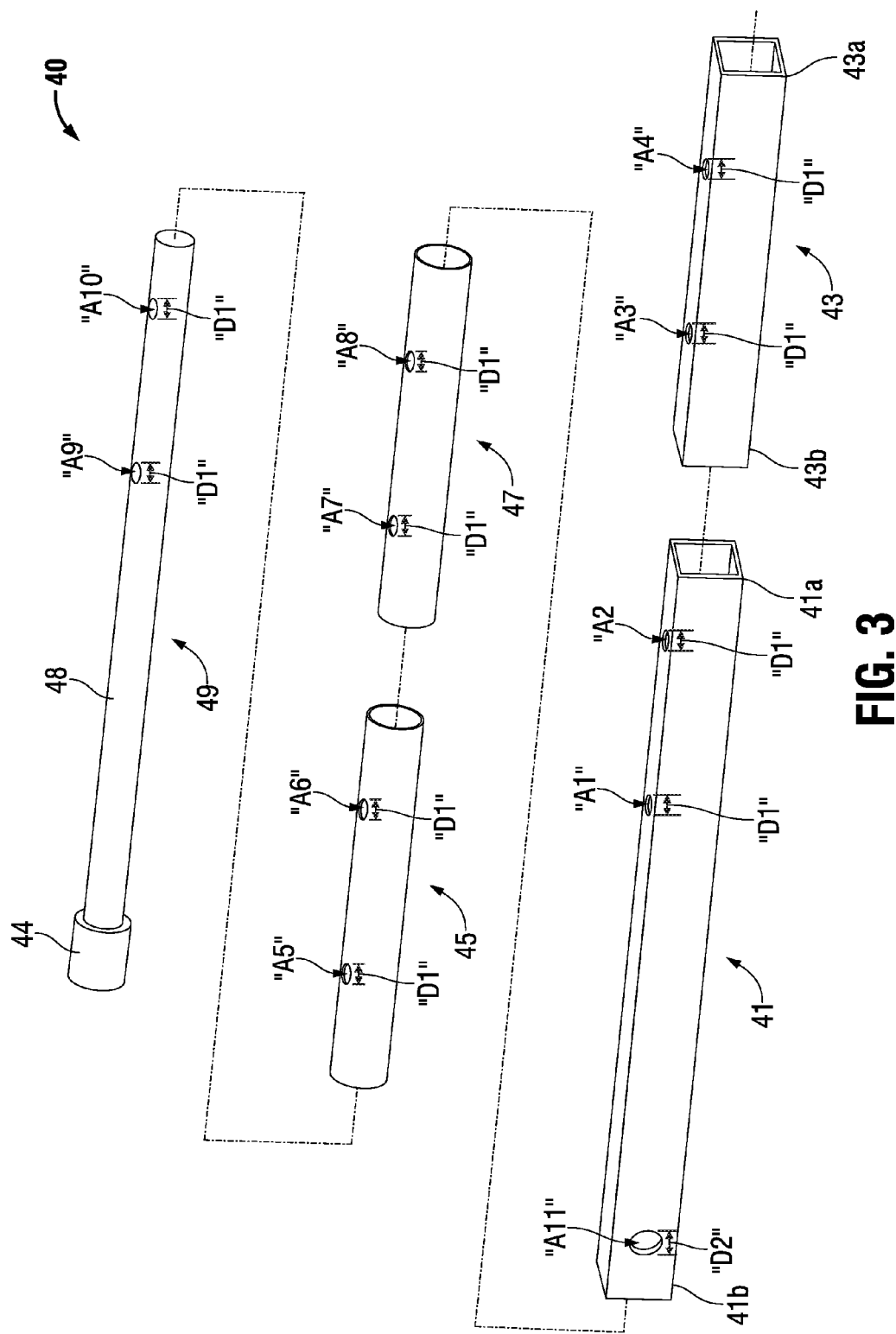
FIG. 3 is a perspective view of the rear loop connector of the modular trailer assembly of FIG. 1A, shown with parts separated, in accordance with an embodiment of the present disclosure.

The rear loop connector 40, which is described in more detail later in this description, includes a first frame member 41 and a second frame member 43 rotatably coupled to one another and defining a longitudinal axis (e.g., axis "A"-"A" shown in FIGS. 11 and 12). When the modular trailer assembly 10 is in a cargo carrying configuration, wherein cargo (e.g., paddle board 30 shown in FIG. 14) is disposed above the support member 16, the first frame member 41 is rotatably moveable about the longitudinal axis "A"-"A" to allow the cargo to track with the vehicle (e.g., bicycle 12) independently of a change in orientation of the one or more wheels of the modular trailer assembly 10. Although an embodiment of the rear loop connector 40 in accordance with the present disclosure is shown in more detail in FIG. 3, it is to be understood that other connector configurations may be utilized. For example, a bearing assembly may be press fit into the first frame member 41 and/or the second frame member 43.

The support member 16 generally includes a proximal end 16a and a distal end 16b, and may include a plurality of rack member attachment regions (e.g., three rack member attachment regions 21, 23, 25 shown in FIG. 1B) spaced apart along the length of the support member 16. The support member 16 may be provided with one or more rack members (e.g., three rack members 22, 24, 26 shown in FIGS. 1A and 1B), each associated with a different one of the rack member attachment regions and capable of supporting an object placed thereon. The rack members 22, 24, 26 may be affixed to the rack member attachment regions 21, 23, 25 in any suitable manner, e.g., joined by welding, brazing, and/or adhesive bonding. Brazing material or adhesive material may be disposed between the rack members 22, 24, 26 and the rack member attachment regions 21, 23, 25, e.g., to facilitate assembly and/or provide strength and rigidity. In some embodiments, the rack members 22, 24, 26 and the rack member attachment regions 21, 23, 25 may be configured to allow the rack members 22, 24, 26 to be selectively removable from the support member 16.

The rack members 22, 24, 26 may each define two identically configured portions such as 22a, 22b, 24a, 24b, 26a, 26b which extend in opposite directions. The portions 22a, 22b, 24a, 24b, 26a, 26b may be fashioned in a variety of linear and/or curvilinear shapes. In some embodiments, as shown for example in FIGS. 1A and 1B, the portions 22a, 22b, 24a, 24b, 26a, 26b include intermediate bends, which are upwardly angled to allow an object or objects to be placed thereon. The portions 22a, 22b, 24a, 24b, 26a, 26b may be provided with a cover material, e.g., sleeves 27. The sleeves 27 may be formed of any suitable material or combination of materials, and may be configured to protect the cargo against damage and/or to inhibit movement of the cargo during transport. Examples of sleeves that may be suitable for use as the sleeves 27 include rubber sleeves and closed-cell foam sleeves. The size and shape of the sleeves 27 may be varied from the configuration depicted in FIG. 1B.

Watersport equipment (e.g., paddle board 30 shown in FIGS. 14 and 17) may be placed to longitudinally extend over the rack members 22, 24, 26 such that the fin 36 extends upwardly. The paddle board 30 may be secured to the rack members 22, 24, 26 via ropes, bungee cords, or straps (e.g., straps 90, 92, 94 shown in FIG. 14). The modular trailer assembly 10 allows for the paddle board 30 to be towed in a manner not obscuring the view of the rider of the bicycle 12. Furthermore, such arrangement between the modular trailer assembly 10 and the paddle board 30 produces a more rigid and secure apparatus in that the combination of the paddle board 30 and the rack members 22, 24, 26 associated with the support member 16 cooperate to impart greater rigidity and strength to the modular trailer assembly 10. Due to the resultant increase in stiffness and strength achieved by the connection of the paddle board 30 (or paddle board, etc.) and the modular trailer assembly 10 to each other, the modular trailer assembly 10 may be fabricated from lighter materials, which enhances the mobility of the same.

Rigidly attached to the underside of the support member 16 adjacent its proximal end 16a is a loop member 15, the use of which is described below. The proximal end 16a of the support member 16 is connected to a frame of a vehicle by the connector 18. In some embodiments, as shown for example in FIG. 1A, the connector 18 is mounted upon the seat post 14 of a bicycle 12 such that the support member 16 extends behind and may be pulled by the bicycle 12. In this illustrative example, the attachment of the connector 18 to the seat post 14 is accomplished by initially removing the seat post 14 from within the seat tube 14a of the bicycle 12. The connector 18 for facilitating the releasable attachment of the support member 16 to the bicycle 12 and connections relating thereto are shown and described in U.S. Pat. No. 5,490,856 entitled "BICYCLE TRAILER," the disclosure of which is herein incorporated by reference in its entirety. It is to be understood, however, that the modular trailer assembly 10 may be adapted to be connected to other vehicles, e.g., powered bicycles, mopeds, motorbike, motorcycles, motor-scooters, and the like.

FIG. 2 shows a rear loop 170 according to an embodiment of the present disclosure that includes a generally fork-shaped member 171 with a wheel 172 rotatably coupled thereto. The rear loop 170 includes a proximal portion 140 configured for engagement with the rear loop connector 140. Extending distally from the proximal portion 140 of the rear loop 170 are two identically configured, arcuately contoured prongs 170a, 170b. The single-wheeled rear loop 170 shown in FIG. 2 is generally similar to the wheel attachment assembly 20 described in the above-mentioned U.S. Pat. No. 5,490,856. The size and shape of the rear loop 170 may be varied from the configuration depicted in FIG. 2.

Figure 1C:
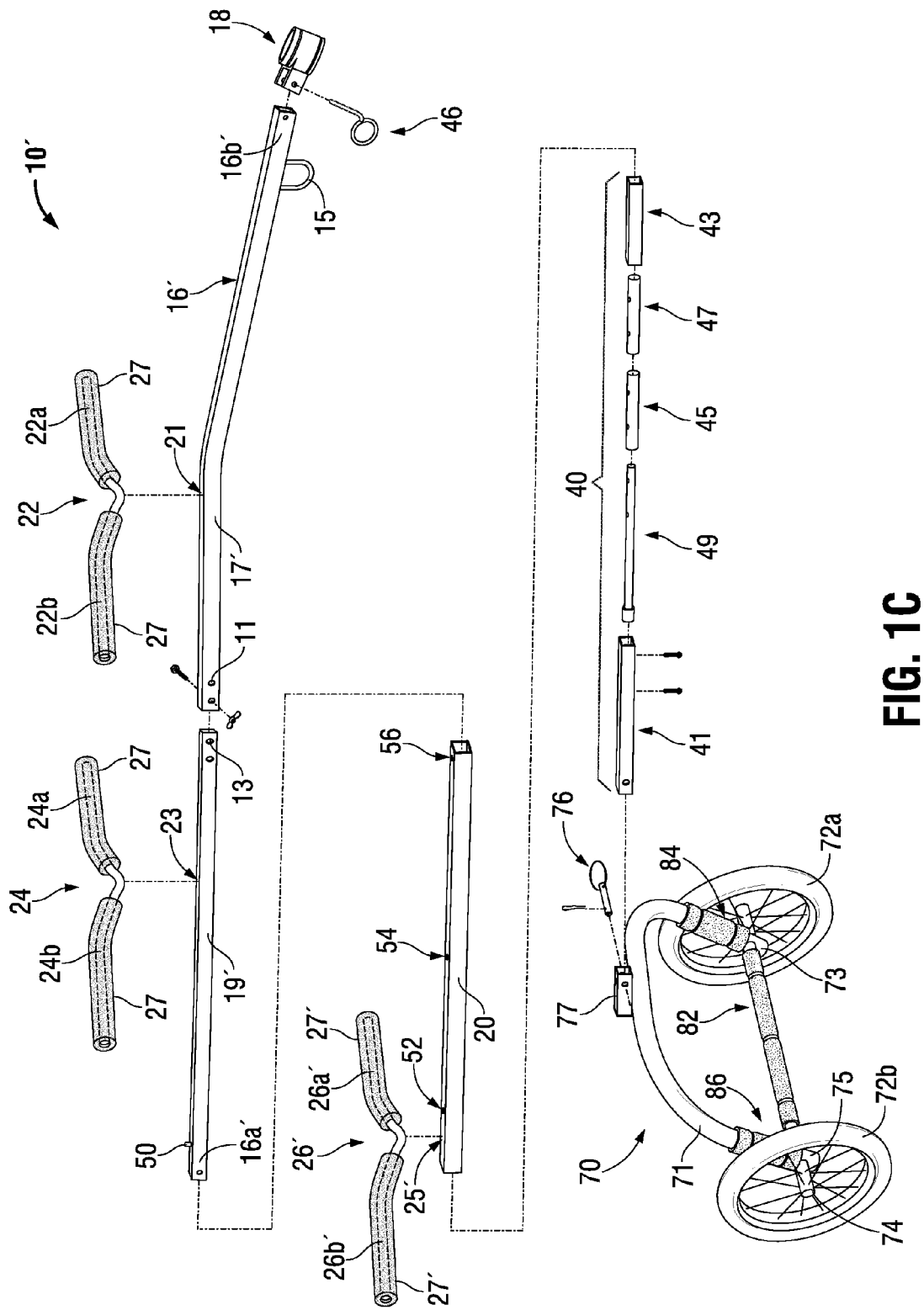
FIG. 1C is a perspective view of a modular trailer assembly, shown with parts separated, in accordance with another embodiment of the present disclosure.

FIG. 1C shows a modular trailer assembly 10' in accordance with an embodiment of the present disclosure that includes a support member extension 20. The modular trailer assembly 10' includes an elongate support member 16' having a proximal end 16a' and a distal end 16b', the rear loop 70, and the rear loop connector 40 disposed between and rotatably coupling the support member extension 20 and the rear loop 70. The modular trailer assembly 10' is similar to the modular trailer assembly 10 shown in FIGS. 1A and 1B, except for the support member extension 20 and the configuration of the support member 16' and the rack member 26', and further description of the like elements is omitted in the interests of brevity.

Figure 13:
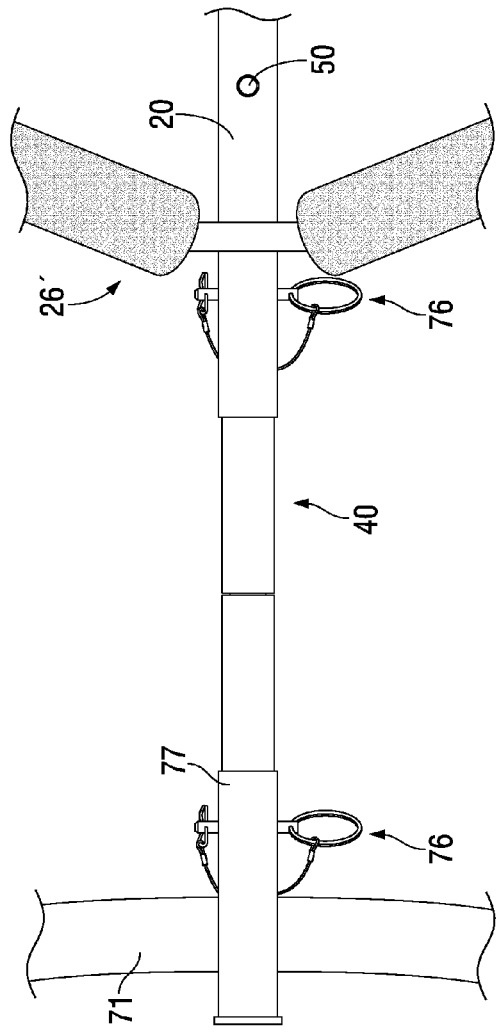
FIG. 13 is a perspective view of the rear loop connector and the rear loop of the modular trailer assembly of FIG. 1C, shown in an assembled state, in accordance with an embodiment of the present disclosure.

As shown in FIG. 1C, the distal segment 19' of the support member 16' includes a push pin 50. The support member extension 20 includes a configuration of spaced-apart apertures 52, 54, 56 defined therein. Each of the apertures 52, 54, 56 is configured to receive the push pin 50 therein; as can be appreciated, this allows the user to selectively extend the length of the support member 16'. As best seen in FIG. 13, the support member extension 20 is adapted for connection to the rear loop connector 40. In some embodiments, as shown for example in FIGS. 1C and 13, the support member extension 20 is provided with a rack member 26'. The rack member 26' is similar to the rack member 26 shown in FIGS. 1A and 1B, and further description thereof is omitted in the interests of brevity. As can be appreciated, the support member extension 20 may be provided with one or more rack members. In other embodiments, the modular trailer assembly 10' may include the rear loop 170 (shown in FIG. 2) coupled to the distal end of the support member extension 20, wherein the proximal end of the support member extension 20 is coupled to the support member 16'.

Figure 15:
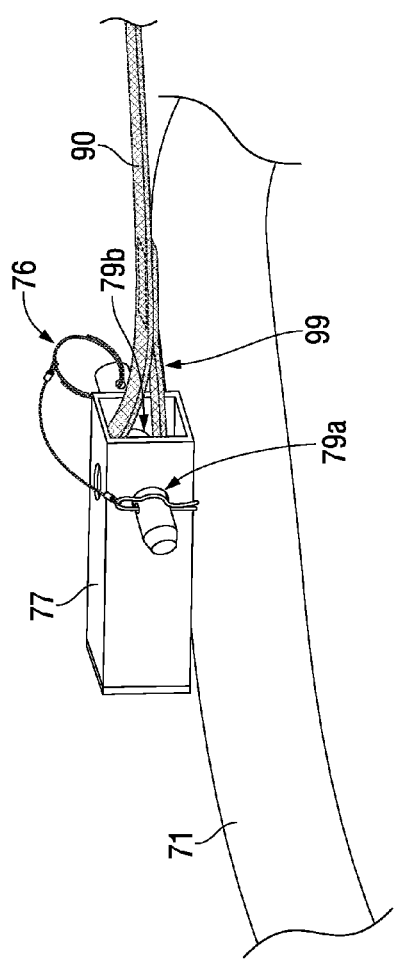
FIG. 15 is a perspective view of the indicated area of detail of FIG. 14 in accordance with an embodiment of the present disclosure.

Referring now to FIGS. 1A, 1B, 1C and 15, the rear loop 70 includes a generally U-shaped support member 71 having distal ends 73 and 75. In some embodiments, as shown for example in FIGS. 1A, 1B and 1C, the rear loop 70 includes a crossmember 74 extending laterally between and coupled to the distal ends 73 and 75 of the support member 71. The size and shape of the support member 71 and the crossmember 74 may be varied from the configuration depicted in FIGS. 1A, 1B and 1C. The rear loop 70 includes a housing 77 attached to the support member 71. As best seen in FIG. 15, the housing 77 defines a channel configured to receive the distal end 41b of the rear loop connector 40 therein. A fastener, e.g., an elongate locking pin 76 having a loop disposed on one end thereof, may be provided for releasably securing the housing 77 and the rear loop connector 40 together. As shown in FIG. 15, the housing 77 defines coaxial apertures 79a, 79b configured to receive the locking pin 76, and the distal end 41b of the rear loop connector 40 defines coaxial apertures 49a, 49b configured to receive the locking pin 76. In some embodiments, as shown for example in FIGS. 1B, 1C, the rear loop 70 includes padding 82 coupled to the crossmember 74 and padding 84, 86 coupled to two opposing portions of the support member 71.

Referring now to FIGS. 3-9, an embodiment of the rear loop connector 40 is shown and includes a first frame member 41, a second frame member 43, a first inner tube 45, a second inner tube 47, and an engagement rod 49. In some embodiments, the first frame member 41 and the second frame member 43 may be formed of mild steel square tubing, and the first inner tube 45 and the second inner tube 47 may be formed of drawn over mandrel (DOM) steel round tube.

As shown in FIG. 8, the first frame member 41 and the second frame member 43 each have height "L9" and width "L10." The first frame member 41 has length "L8" and includes a first aperture "A1" spaced apart from a second aperture "A2" by length "A6." The first aperture "A1" is spaced apart from the distal end 41b of the first frame member 41 by length "L7," and the second aperture "A2" is spaced apart from the proximal end 41a of the first frame member 41 by length "L5." In some embodiments, the length "L8" of the first frame member 41 is about 8.0 inches.

The second frame member 43 has length "L4" and includes a third aperture "A3" spaced apart from a fourth aperture "A4" by length "A6." The third aperture "A3" is spaced apart from the distal end 43b of the second frame member 43 by length "L5," and the fourth aperture "A4" is spaced apart from the proximal end 43a of the second frame member 43 by length "L5." In some embodiments, the length "L4" of the second frame member 43 is about 6.0 inches. The first through fourth apertures "A1" through "A4" may have a diameter of about 0.25 inches, and the length "L6" between the first and second apertures "A1," "A2" and the third and fourth apertures "A3," "A4," respectively, may be about 1.6 inches. In some embodiments, the length "L5" is about 0.75 inches.

The first inner tube 45 and the second inner tube 47 each have length "L4," inner diameter "D3", and outer diameter "D4." In some embodiments, the length "L4" of the first and second inner tubes 47, 45 is about 5.5 inches, the inner diameter "D3" may be about 0.625 inches, and the outer diameter "D4" may be about 0.875 inches. The first inner tube 45 includes a fifth aperture "A5" spaced apart from a sixth aperture "A6" by length "A6." The fifth and sixth apertures "A5," "A6" are spaced apart from the ends of the first inner tube 45 by length "L5." The second inner tube 47 includes a seventh aperture "A7" spaced apart from an eighth aperture "A8" by length "A6." The seventh and eighth apertures "A7," "A8" are spaced apart from the ends of the second inner tube 47 by length "L5." In some embodiments, the fifth through eighth apertures "A5" through "A8" may have a diameter "D1" of about 0.25 inches, and the length "L6" between the first and second apertures "A1," "A2" and the third and fourth apertures "A3," "A4," respectively, may be about 1.6 inches.

The engagement rod 49 having length "L3" includes an elongate rod 48 having length "L1" and diameter "D3" and a cap 44 having length "L2" and diameter "D4." The rod 48 includes a ninth aperture "A9" having diameter "D1" and a tenth aperture "A10" having diameter "D1." The ninth and tenth apertures "A9" and "A10" are configured with threads. The treaded, ninth and tenth apertures "A9" and "A10" are spaced apart by length "A6," e.g., to coaxially align with the seventh and eighth apertures "A7," "A8" of the second inner tube 47.

In accordance with embodiments of the presently-disclosed rear loop connector 40, the diameter "D3" of the elongate rod 48 of the engagement rod 49 is equal to the inner diameter "D3" of the first and second inner tubes 45, 47; and the diameter "D4" of the cap 44 of the engagement rod 49 is equal to the outer diameter "D4" of the first and second inner tubes 45, 47; wherein the diameter "D4" is less than or equal to the height "L9" and width "L10" of the first and second frame members 41, 43. In some embodiments, the seventh and eighth apertures "A7," "A8" of the second inner tube 47, the (threaded) ninth and tenth apertures "A9," "A10" of the engagement rod 49, and the third and fourth apertures "A3," "A4" of the second frame member 43 are coaxially aligned and these structures are bolted together (FIG. 10). Additionally, or alternatively, the (threaded) fifth aperture and sixth apertures "A5," "A6" of the first inner tube 45 are coaxially aligned with the first and second apertures "A1," "A2" of the first frame member 41, and these structures are bolted together (FIG. 10).

Figure 12:
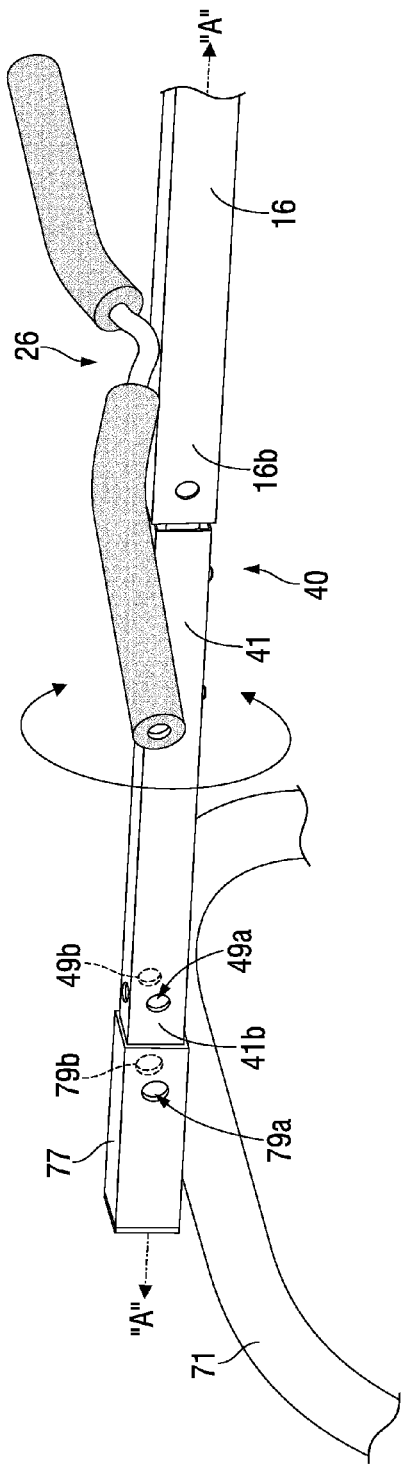
FIG. 12 is a perspective view of the rear loop connector and the rear loop of the modular trailer assembly of FIG. 1A, shown in a partially assembled state, in accordance with an embodiment of the present disclosure.

Referring now to FIGS. 10-12, the second frame member 43 is connected to the distal end 16b of the support structure 16 (FIGS. 10 and 11) and the first frame member 41 of the rear loop connector 40 is connected to the housing 77 (FIG. 12), and a longitudinal axis "A"-"A" is defined therethrough. As shown in FIG. 12, the distal end 41b of the first frame member 41 of the rear loop connector 40 is aligned with the housing 77, e.g., along the longitudinal axis "A"-"A," for engagement with an interior channel defined by the housing 77. The coaxial apertures 79a, 79b defined by the housing 77 are aligned with the coaxial apertures 49a, 49b defined in the distal end of the rear loop connector 40, and the housing 77 is releaseably fixed relative to rear loop connector 40 by a locking pin 76 (FIG. 13).

In addition to providing a system for transporting watersport equipment, e.g., one or more surfboards and/or paddle boards, the modular trailer assembly 10 may include one or more utility storage bags (e.g., utility storage bag 28 shown in FIG. 1A). The utility storage bag 28 may include a hammock-like member having ends configured to be attachable to one or more of the rack members 22, 24, 26. For example, the utility storage bag 28 may be suspended from the first and second rack members 22 and 24, respectively, such that the utility storage bag 28 extends longitudinally underneath a portion of the support member 16. While in this configuration, objects such as beach towels, Frisbees, beverages, wetsuits, and the like may be stored therein and transported. As will be recognized, the utility storage bag 28 may take a number of different forms and may further include one or more suitable pockets or pouches, which may be configured with zipper or snap closures to better secure stored items during transport.

The support member 16 may be adapted to be collapsible, e.g., to facilitate compact storage of the modular trailer assembly 10 when not in use. The support member 16 may include a plurality of telescoping segments disposed between the proximal end 16a and the distal end 16b thereof. In some embodiments, as shown for example in FIG. 1B, the support member 16 includes a proximal segment 17 and a distal segment 19 adapted to allow the support member 16 to be selectively movable between an extended configuration, wherein the rack members 22, 24, 26 are positioned for use, and a collapsed configuration for storage. The proximal segment 17 may include one or more apertures (e.g., seven apertures 11 shown in FIG. 1B) and the distal segment 19 may include one or more apertures (e.g., aperture 13 shown in FIG. 1B), wherein each of the apertures 11, 13 is configured to receive a locking pin 46 therethrough. The number of telescoping segments and the relative locations of the apertures for receiving the locking pin 46 may be varied from the configuration depicted in FIG. 1B.

As previously explained, the modular trailer assembly 10 in accordance with the present disclosure is utilized by initially attaching the connector 18 to a frame of a vehicle. Subsequent to the extension of the telescoping, support member 16 and placement of a first locking pin 46, the proximal end 16a of the support member 16 is pivotally connected to the connector 18 via a second locking pin 46, as described in the above-mentioned U.S. Pat. No. 5,490, 856. Thereafter, a paddle board 30 or other cargo may be placed upon the rack members 22, 24, 26 and secured thereto. Additionally, other types of objects may be placed into the utility storage bag 28 either before or after the placement of the cargo upon the rack members 22, 24, 26. In the event that the vehicle (e.g., bicycle 12) and accompanying modular trailer assembly 10 are to be left unattended at a certain location, an elongate chain may be extended through the loop member 15, about a portion of the bicycle frame, and around an object such as a bicycle rack or tree. The chain may be further extended through the loop of the second locking pin 46 to prevent the same from being slidably removed from within the connector 18. After use of the modular trailer assembly 10 has been completed, the second locking pin 46 is removed from the connector 18, thus releasing the support member 16 from its pivotal connection thereto. After the paddle board 30 or other cargo has been removed from the rack members 22, 24, 26, the first locking pin 46 is removed to allow the telescoping, support member 16 to be collapsed for storage.

Figure 14:
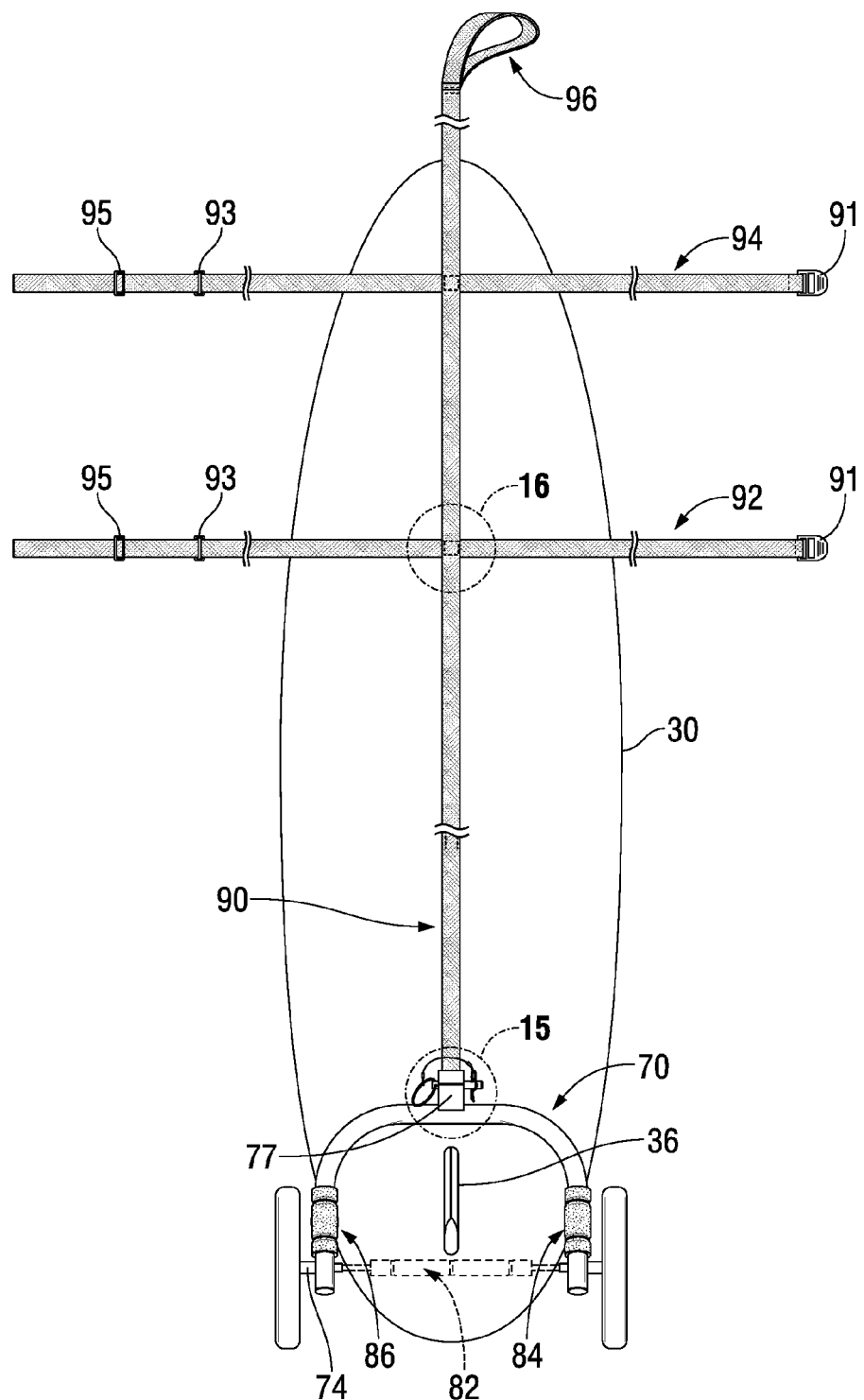
FIG. 14 is a perspective view of the rear loop of the modular trailer assembly of FIG. 1A, shown with a surfboard placed thereon, and illustrating a configuration of cargo securing elements in accordance with an embodiment of the present disclosure.
Figure 16:
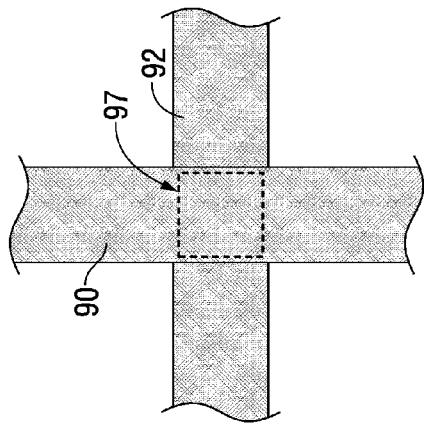
FIG. 16 is a perspective view of the indicated area of detail of FIG. 14 in accordance with an embodiment of the present disclosure.

Referring now to FIGS. 14-16, a configuration of cargo securing elements (referred to herein as "straps") may be used for securing a paddle board 30 (and/or other watersport equipment) to the rear loop 70. Although a configuration of three straps 90, 92, 94 is shown in FIG. 15, it will be recognized that any suitable number of straps may be utilized. One or more of straps (e.g., two straps 92, 94 shown in FIG. 14) may be provided with tensioning members 95 and/or connectors 93 to facilitate the selective increase or decrease in the lengths of the straps. In this respect, the required length of the straps 90, 92, 94 is dependent upon the length and girth of the load to be secured to the rear loop 70. It is contemplated that one or more potions of the straps 90, 92, 94 may be releaseably attached, fastened, or otherwise associated with a surfboard bag (not shown). In some embodiments, as shown for example in FIG. 14, the elongate strap 90 may be provided with a hand loop 96 configured to be grasped by the user's hand.

As best seen in FIG. 15, the elongate strap 90 is coupled by a loop portion 99 to the housing 77 of the rear loop 70 and secured by a locking pin 76 slidably extended through the coaxially-aligned apertures 79 defined by the housing 77. As shown in FIG. 16, the elongate strap 90 may be fixedly coupled to the strap 92 (and/or strap 94) by stitching 97.

As shown in FIG. 14, an opening defined by the support member 71 and the crossmember 74 of the rear loop 70 is configured to accommodate an end portion of the paddle board 30, wherein the padded portions 82, 84, 86 may be configured to protect the paddle board 30 from making contact with the crossmember 74 and/or the support member 71 during loading and/or transport.

Figure 17:
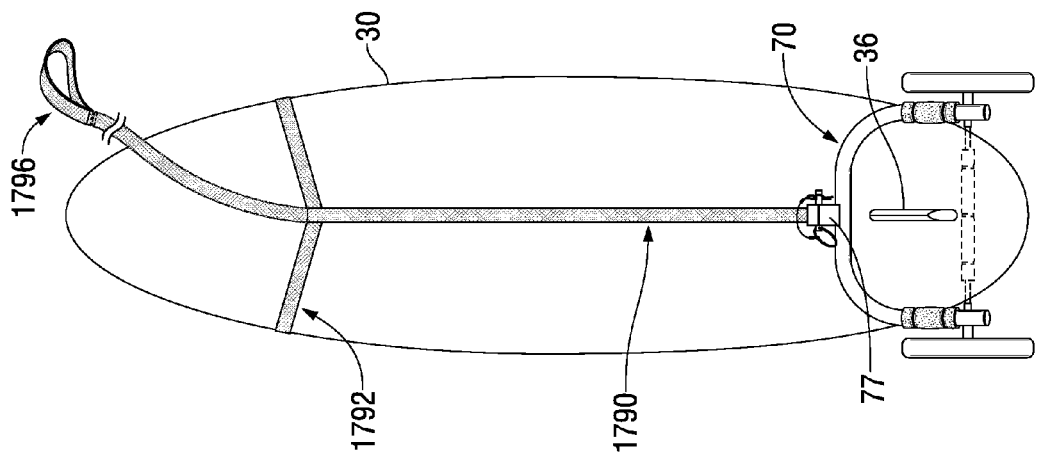
FIG. 17 is a perspective view of the rear loop of the modular trailer assembly of FIG. 1A, shown with a surfboard placed thereon, and illustrating a configuration of cargo securing elements in accordance with another embodiment of the present disclosure.

FIG. 17 shows a configuration of two straps 1790, 1792 for securing a paddle board 30 to the rear loop 70. The elongate strap 1790 and/or the strap 1792 may be made of flat polypropylene cord straps, or other suitable materials. In some embodiments, the elongate strap 1790 may be provided with a hand loop 1796 configured to be grasped by the user's hand.

Figure 18:
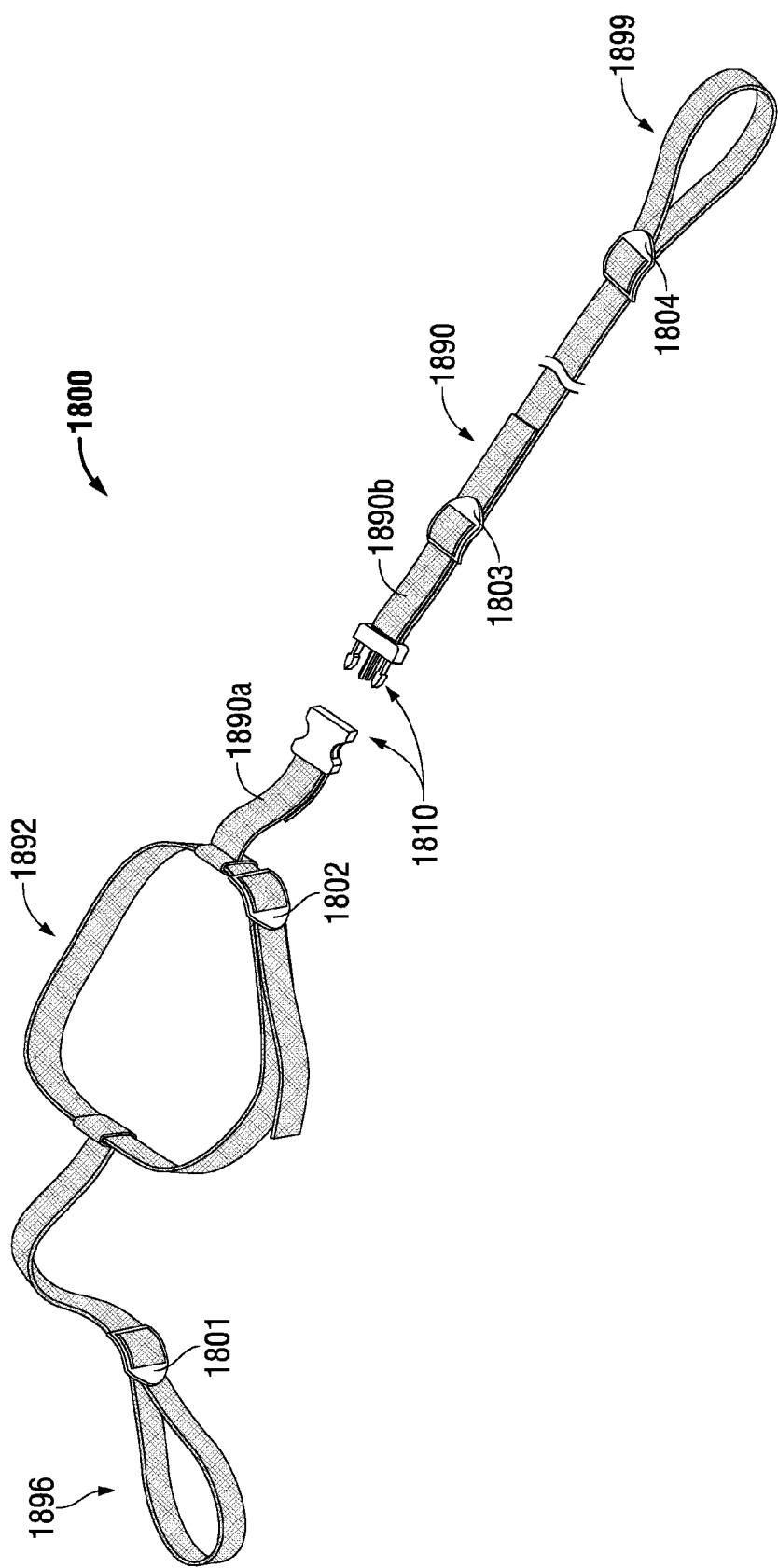
FIG. 18 is a perspective view of a configuration of cargo securing elements in accordance with another embodiment of the present disclosure.

FIG. 18 shows a configuration of cargo securing elements (shown generally as 1800) adapted for use to secure watersport equipment (e.g., paddle board 30 shown in FIGS. 14 and 17) to the rear loop 70. The configuration of cargo securing elements 1800 includes an elongate strap 1890 having a first strap portion 1890a and a second strap portion 1890b. In some embodiments, as shown for example in FIG. 18, the first strap portion 1890a and the second strap portion 1890b are releaseably connectable via a connector 1810. Connector 1810 is configured to clip together, and may be adapted to allow for selective length adjustment of the first strap portion 1890a and/or the second strap portion 1890b.

As shown in FIG. 18, the second strap portion 1890b is provided with a main loop 1892 configured for securely engaging the nose of a paddle board 30 (or a surfboard, etc.). The length of the main loop 1892 is selectively adjustable by use of an adjustment member 1802. The second strap portion 1890b is provided with a loop portion 1899 configured for coupling the elongate strap 1890 to the housing 77 of the rear loop 70. The length of the loop portion 1899 may be selectively adjustable by use of an adjustment member 1804. The first strap portion 1890a is provided with a hand loop 1896 configured to be grasped by the user's hand. The length of the hand loop 1896 may be selectively adjustable by use of an adjustment member 1801.

Although embodiments have been described in detail with reference to the accompanying drawings for the purpose of illustration and description, it is to be understood that the disclosed processes and apparatus are not to be construed as limited thereby. It will be apparent to those of ordinary skill in the art that various modifications to the foregoing embodiments may be made without departing from the scope of the disclosure.

What is claimed is:

1. A modular trailer assembly configured for attachment to a frame of a vehicle, the modular trailer assembly comprising:
   an elongate support member including a proximal end, a distal end, a length defined between the distal end and the proximal end, and a plurality of rack member attachment regions spaced apart along the length;
   a first connector rigidly mountable to the frame of the vehicle, wherein the proximal end of the support member is pivotally connected to the first connector and selectively detachable therefrom;
   a rear loop including a proximal end and a distal end, wherein at least one wheel is rotatably connected to the distal end; and
   a second connector including a proximal end, a distal end, and a longitudinal axis between the distal end and the proximal end, wherein the second connector includes a first frame member and a second frame member rotatably coupled to one another, a distal end of the first frame member configured to engage the proximal end of the rear loop, a proximal end of the second frame member configured to engage the distal end of the support member, wherein the second connector further includes a first inner tube, a second inner tube, and an engagement rod,
   wherein, when cargo is disposed above the support member, the first frame member is rotatably moveable about the longitudinal axis to allow the cargo to track with the vehicle independently of a change in orientation of the at least one wheel.

2. The modular trailer assembly of claim 1, further comprising a plurality of rack members each coupled to a different one of the plurality of rack member attachment regions.

3. The modular trailer assembly of claim 2, wherein the support member further includes a plurality of telescoping segments disposed between the proximal end and the distal end thereof, the telescoping segments adapted to allow the support member to be selectively movable between at least one extended configuration, wherein the rack members are positioned for use, and a collapsed configuration for storage.

4. The modular trailer assembly of claim 1, further comprising a utility storage bag having a first end attached to one of the plurality of rack members and a second end attached to a different one of the plurality of rack members, wherein the utility storage bag is suspended from and extends longitudinally beneath the support member.

5. The modular trailer assembly of claim 1, wherein the engagement rod includes an elongate rod configured to be slidably received with the first and second inner tubes.

6. The modular trailer assembly of claim 5, wherein the engagement rod further includes a cap disposed at one end of the elongate rod, the cap having an outer diameter equal to an outer diameter of the first and second inner tubes.

7. The modular trailer assembly of claim 6, wherein the first and second inner tubes are formed of drawn over mandrel (DOM) steel round tube.

8. The modular trailer assembly of claim 7, wherein the second frame member has a height and a width, and wherein the second inner tube is configured to fit within the second frame member.

9. The modular trailer assembly of claim 8, wherein the second frame member is formed of mild steel square tubing.

10. A bicycle trailer configured for attachment to a bicycle frame, the bicycle trailer comprising:
    an elongate support member having proximal and distal ends;

a plurality of rack members attached to the support member in spaced relation to one another;

a first connector rigidly mountable to the bicycle frame, wherein the proximal end of the support member is pivotally connected to the first connector and selectively detachable therefrom;

a rear loop having a proximal end and a distal end;

at least one wheel rotatably connected to the distal end of the rear loop; and a second connector including a proximal end, a distal end, and a longitudinal axis defined therebetween, wherein the second connector includes a first frame member and a second frame member rotatably coupled to one another, wherein a distal end of the first frame member is configured to engage the proximal end of the rear loop and a proximal end of the second frame member is configured to engage the distal end of the support member, wherein the second connector further includes a first inner tube, a second inner tube, and an engagement rod;

wherein, when cargo is disposed above the support member, the first frame member is rotatably moveable about the longitudinal axis to allow the cargo to track with the bicycle frame independently of a change in orientation of the at least one wheel.

11. The bicycle trailer of claim 10, wherein the support member includes a plurality of telescoping segments disposed between the proximal end and the distal end thereof, the telescoping segments adapted to allow the support member to be selectively movable between at least one extended configuration, wherein the rack members are positioned for use, and a collapsed configuration for storage.

12. The bicycle trailer of claim 10, wherein the rear loop includes:

a generally U-shaped support member having distal ends; and a crossmember extending laterally between and coupled to the distal ends of the support member.

13. The bicycle trailer of claim 10, wherein the cargo is watersport equipment.

* * * * *